Oct. 25, 1966   A. W. KINGSTON   3,281,199
PROJECTION APPARATUS WITH CASSETTE FOR SOUND FILMS
Filed July 23, 1965   4 Sheets-Sheet 1

INVENTOR
Arthur W. Kingston
BY
ATTORNEYS

Oct. 25, 1966    A. W. KINGSTON    3,281,199

PROJECTION APPARATUS WITH CASSETTE FOR SOUND FILMS

Filed July 23, 1965    4 Sheets-Sheet 2

INVENTOR
Arthur W. Kingston
BY Kemon, Palmer,
Stewart & Estabrook
ATTORNEYS

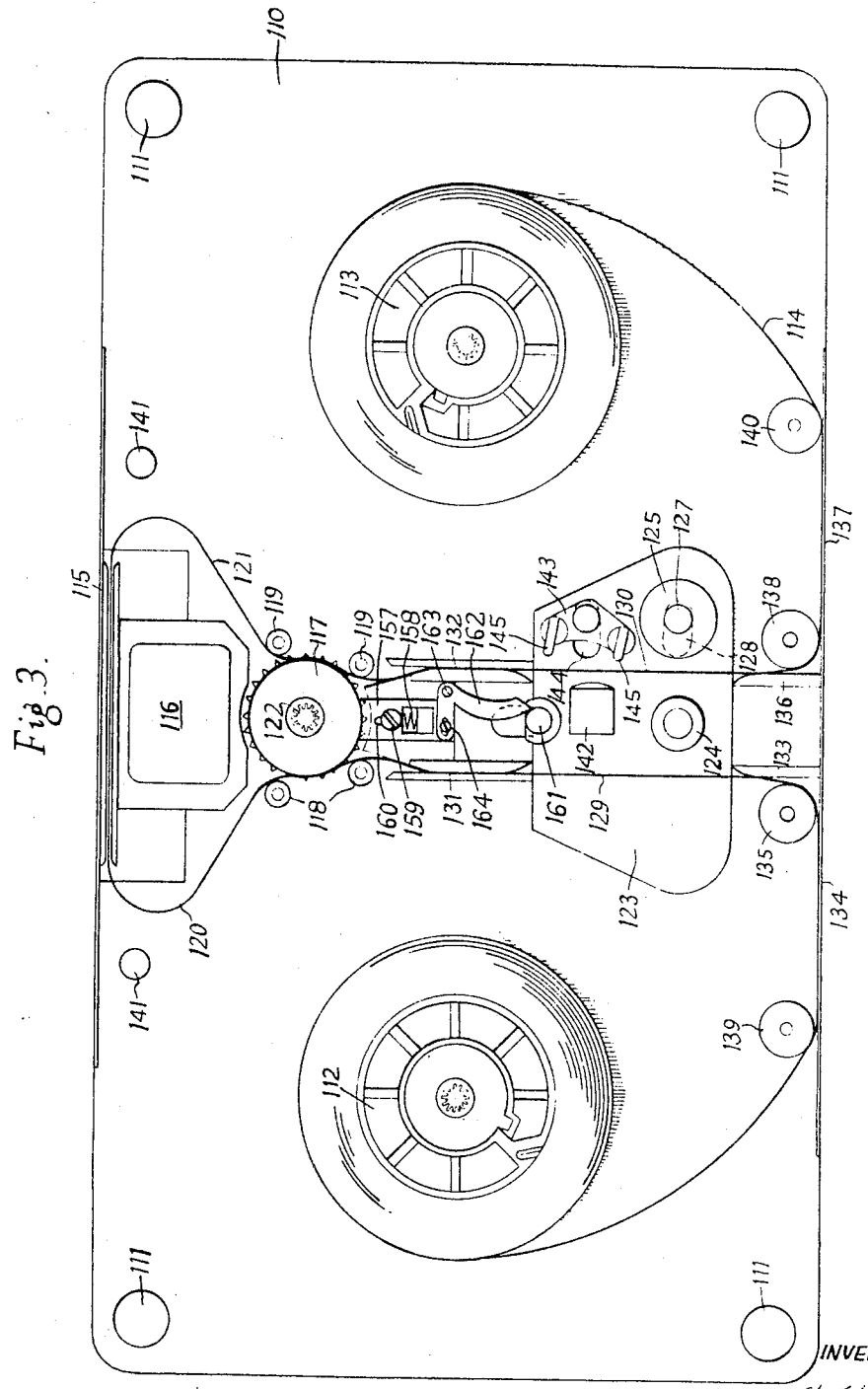

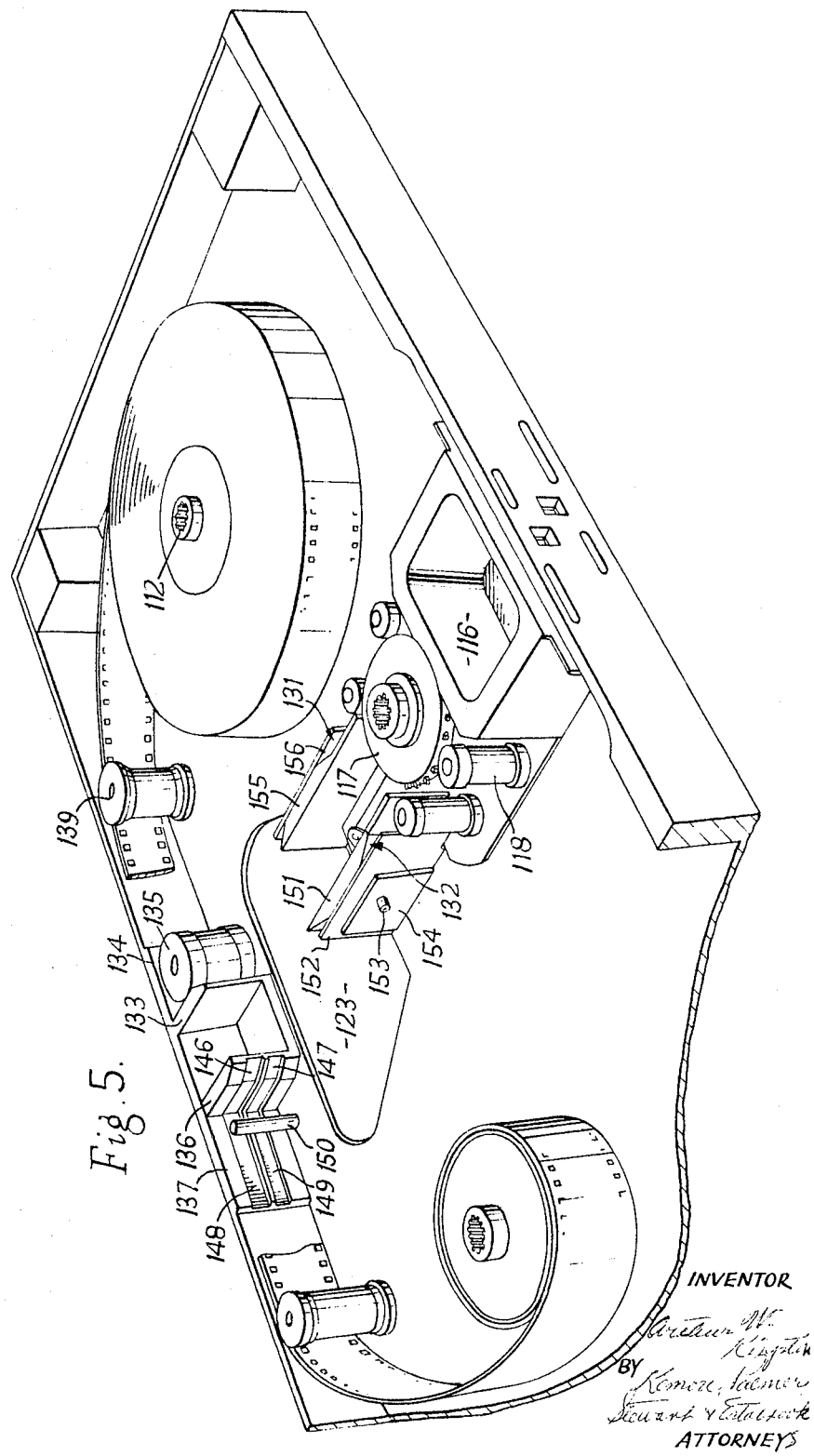

United States Patent Office

3,281,199
Patented Oct. 25, 1966

3,281,199
PROJECTION APPARATUS WITH CASSETTE FOR SOUND FILMS
Arthur William Kingston, The Old Mill House, Willowbank, Denham, England
Filed July 23, 1965, Ser. No. 474,445
Claims priority, application Great Britain, May 19, 1961, 18,439/61; Aug. 15, 1961, 29,436/61
14 Claims. (Cl. 352—72)

The present invention relates to projection apparatus for sound film incorporating a removable cassette in which the film is contained. This application is a continuation-in-part of my co-pending application Serial No. 193,910, now abandoned.

My prior Patent No. 2,624,231, issued January 6, 1953, describes projection apparatus for film having an optical sound track in which the film is carried in a cassette. Other apparatus for film having an optical sound track is known but the inventor knows of no satisfactory cassette projector using film with a magnetic sound track. The primary difficulty with a magnetic sound track is that great uniformity of film speed is required to obtain the best sound and all irregularities of movement which occur in the intermittent feeding of the film through a film gate and in the normal sprocket drives for the film must be eliminated.

Accordingly it is an object of the present invention to provide a sound film projection apparatus having a cassette containing the film, and a driving capstan and pressure roller mounted externally of the cassette but engageable with the film in the cassette to draw it past a sound head.

For reliable foolproof operation it is essential that the cassette shall be easy to place in position on the projector and the film shall then be in the correct position for operation. It is accordingly a further object of the invention to provide means in the cassette for holding the film ready for correct location with respect to the sound head, driving capstan, and pressure roller when the cassette is placed in position on the projection apparatus.

Figure 1:
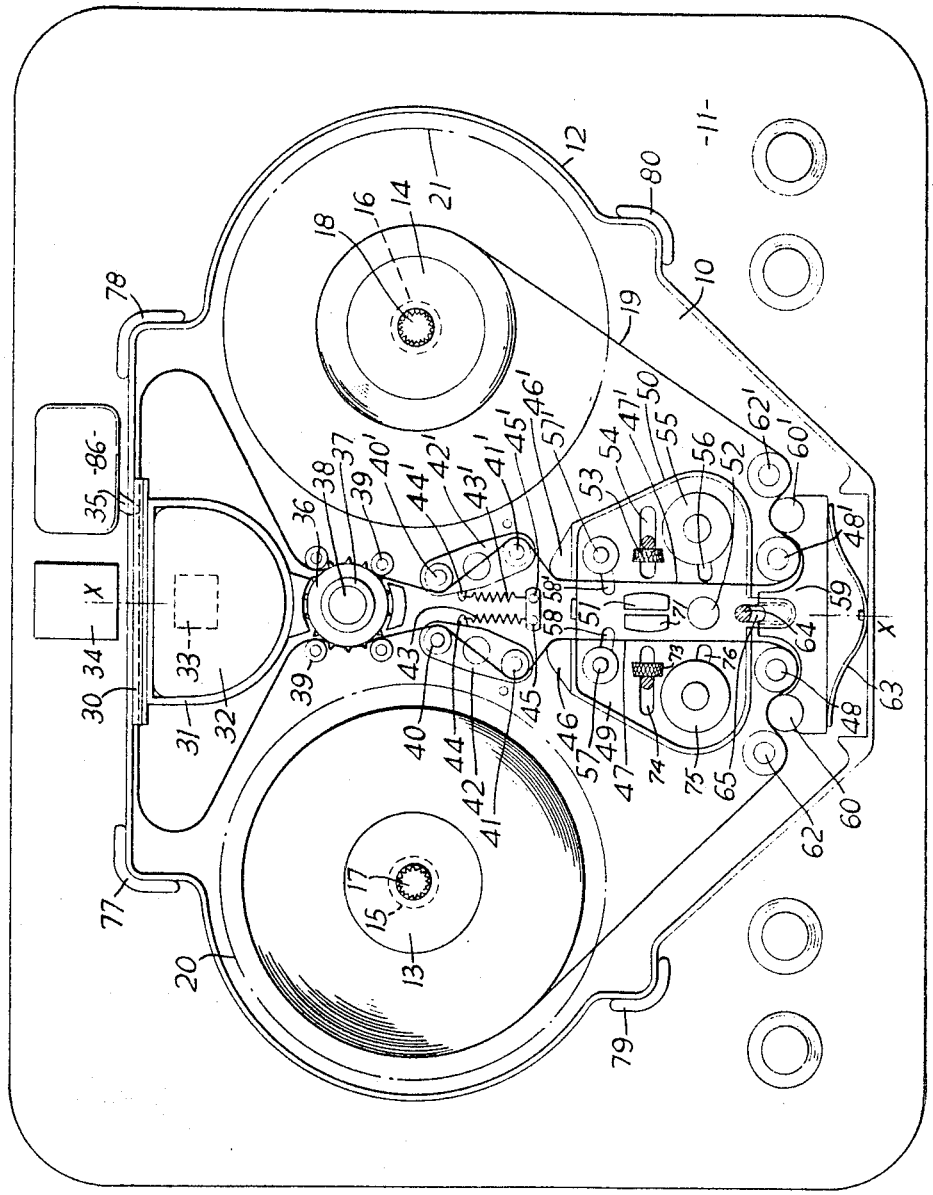
Figure 2:
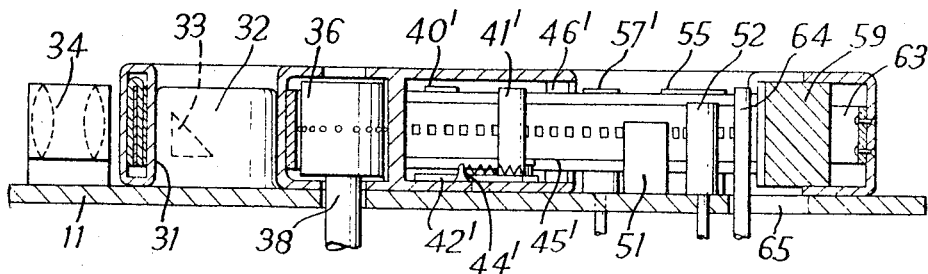
Figure 4:
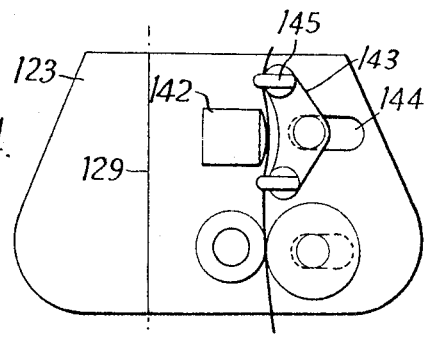
Figure 2A:
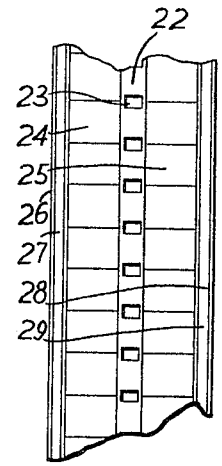
Figure 6:
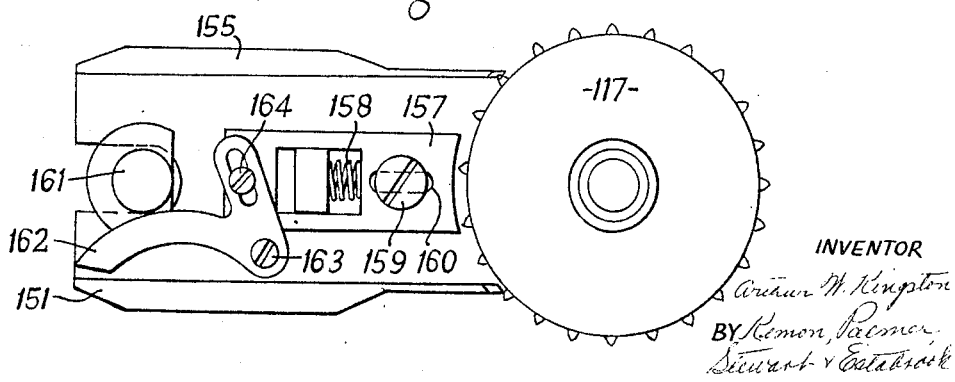

Other objects, features and advantages will become apparent from the following description taken together with the drawings, in which:

FIG. 1 is a plan view of a cassette in place on the deck of a projector, the upper wall of the cassette being removed, FIG. 2 is a section on the line X—X of FIG. 1, FIG. 2a shows a piece of the film contained in the cassette, FIG. 3 is a diagrammatic plan view of a second cassette with the upper casing removed to show the internal layout, the essential co-operating parts of the projector deck being shown also, FIG. 4 is a detail of FIG. 3 with the parts of the projector deck in their operative positions, FIG. 5 is a perspective view of part of the cassette of FIGS. 3 and 4, showing the structure in more detail, and FIG. 6 is a detail of FIG. 3 showing the braking device for the sprocket.

In FIG. 1 the cassette is shown with the upper side wall removed to show the parts contained within the cassette. The cassette has a lower side wall 10 which rests on the deck 11 and is joined to the upper side wall by an edge wall 12. The cassette is symmetrical about a centre line X—X. Two bobbins 13 and 14 are disposed symmetrically about the line X—X within the cassette and are journalled on tubular rims 15 and 16 respectively projecting inwards from the side wall 10 and corresponding tubular rims on the upper side wall. The centres of the bobbins 13 and 14 have internally splined holes for engagement with driving spindles 17 and 18 respectively projecting upwards from the deck 11. A length of film 19 is attached to the bobbins 13 and 14 and runs between them. The edges of the film are guided by guides moulded into the walls of the cassette and by guide rollers. The bobbins 13 and 14 may have flanges extending out to the circumference shown by the broken lines 20 and 21 respectively and serving to guide the film on and off the bobbins or this function may be performed by guides in the casing, for example in the form of ribs radiating from the bobbins.

The film 19 is 16 mm. film having a central perforated strip for engagement by the film traction mechanism. On each side of the perforated strip is a picture track and, at the outer edge of the film, a magnetic sound track. The two picture tracks with their associated sound tracks run in opposite directions and the film has to be drawn through the film gate in opposite directions for the projection of the two tracks.

A film gate 30 is disposed within the cassette and lies transversely across the centre line X—X at a position close to the edge wall 12 of the cassette. The cassette has a through aperture behind the film gate 30 which is bounded by a wall 31. A housing 32 mounted on the deck 11 projects into the through aperture. The housing 32 has within it a reflecting prism 33 for directing light from a light source below the deck through the film gate 30 and through a projection sysem 34 mounted on the deck. The film 19 is drawn intermittently through the film gate 30 by engagement of a claw 35 of film traction mechanism 86 in the perforations 23 of the film.

The film gate and the apparatus for drawing the film through the gate and projecting the film are substantially conventional and are therefore only shown schematically in the drawing. Reference may be made to my Patent No. 2,624,231 for details of one form which this apparatus may take but many other constructions are possible in accordance with the known practice in film projection apparatus. Patent No. 2,624,231 also gives details of the manner in which the bobbins or spools are mounted in the cassette and of several other features of the apparatus now being described.

As described in Patent No. 2,624,231 the film gate consists of a fixed apertured plate and a spring-loaded apertured plate between which the film passes. Each plate of the film gate has two apertures in register with the two film tracks, the apertures being equally spaced on either side of the centre line of the cassette, and a shutter is arranged to cover the apertures in register with one film track when the other track is being projected and to cover both apertures when the cassette is not in use. The wall 31 of the through aperture in the cassette is apertured where necessary to permit light from the prism 33 to pass through the film gate 30. The edge wall 12 of the cassette is slotted to allow the claw 35 to engage in the perforations of the film 19 carried in the cassette.

A driving sprocket 36 is rotatably mounted in the cassette on the centre line X—X and its hub 37 engages over a driving spindle 38 projecting upwards from the deck 11. The teeth of the driving sprocket 36 engage the perforations 23 of the film 19 which is guided by rollers 39 past both sides of the sprocket 36, passing from one side of the sprocket to the film gate and back to the other side of the sprocket. Thus the length of the loop of film passing through the film gate is kept constant since the sprocket draws the film away on one side as fast as it feeds the film on the other side to the gate.

The film passing from one side of the driving sprocket 36 runs in a circuitous path around guide rollers 40 and 41 which are carried by a centrally-pivoted arm 42. A spring 43 is connected to a lug 44 on the arm 42 and to the wall 10 of the cassette at 45 and applies a rotational bias to the arm 42 tending to increase the tension in the film 19 running around the guide rollers 40 and 41. The film running from the other side of the sprocket 36 runs over a symmetrically arranged guiding and tensioning device the parts of which have been given the corresponding primed reference numerals 40' to 45'.

Since the film itself has considerable resilience the structure of the tensioning device may be simplified without substantial loss of efficiency by attaching the guides 40 and 41 directly to the cassette or moulding guides on the inner surfaces of the walls of the cassette to cause the film to follow a similar circuitous path. This simple arrangement will be sufficient to prevent transmission of any irregularities in the movement of the film by the driving sprocket 36 to the parts of the film beyond the guides.

From the guide rollers 41 and 41' the two parts of the film pass around guides 46 and 46' moulded in the cassette and thence along rectilinear path sections 47 and 47' to further guide rollers 48 and 48'. The two rectilinear path sections 47 and 47' of the film 19 extend across a through opening 49 in the cassette bounded by a wall 50 joining the upper and lower side walls of the cassette which has the necessary openings to allow the free passage of the film across the opening 49. The path sections 47 and 47' are generally parallel to one another and symmetrical with respect to the centre line X—X of the cassette.

A magnetic head 51 and a driving capstan 52 carried by the deck 11 project into the opening 49 between the two rectilinear path sections 47 and 47'. A pressure pad 53 is slidably mounted in a slot 54 in the deck 11 for movement towards the magnetic head 51 to press the section 47' of the film against the head 51. A pressure roller 55 is slidably mounted in a slot 56 in the deck 11 for movement towards the capstan 52 to press the section 47' of the film into contact with the capstan. A second magnetic head 71 is provided for co-operation with the film passing along the rectilinear path section 47 which is pressed against the head 71 by a pressure pad 73 moving in a slot 74. A pressure roller 75 movable in a slot 76 serves to press the film against the driving capstan 52. Rollers 57 and 57' are slidably mounted in slots 58 and 58' in the deck 11 for movement towards one another to lift the film away from the fixed guides 46 and 46'.

Upon initiation of the operation of the apparatus for the playing of one of the picture and sound tracks the rollers 57 and 57', the pressure pad 53, and the pressure roller 55 are simultaneously moved in their slots so that the sections 47 and 47' of the film run freely between the rollers 48 and 57 and the rollers 48' and 57' respectively and the section 47' is drawn by the capstan 52 past the magnetic head 51, against which it is pressed by the pad 53. The elements 71, 73 and 75 remain inoperative during the playing of this track of film. After completion of the playing of the first picture and sound tracks the elements 51, 53 and 55 are rendered inoperative and replaced by the bringing into operation of the elements 71, 73 and 75. The direction of rotation of the capstan 52, the driving sprocket 36, and the spindles 17 and 18, and the direction of movement of the film through the film gate 30 are reversed. The optical system is re-aligned with the second picture track by raising the reflecting prism 33 and the projection system 34, which are mounted on a movable platform for this purpose. A shutter provided in the cassette to cover the apertures in the walls which are not in use must also be moved to a new position. The apertures for the two tracks may be one above the other, in which case the shutter is merely moved up or down to uncover the appropriate aperture. Alternatively the apertures may be staggered and covered by a shutter as described in Patent No. 2,624,231.

The drive for the sprocket 36 is of course synchronised with the drive to the capstan 52 so that the film passes both of them at substantially the same rate.

When the apparatus is not in operation the position of the film 19 is maintained by a locking device 59 carrying two posts 60 and 60' which jam between the guide roller 48 and a further guide roller 62 and between the guide roller 48' and a further guide roller 62' and thus grip the film. The locking device is biassed by a leaf spring 63. When operation of the apparatus is initiated the locking device 59 is displaced against the spring 63 by means of a peg 64 which projects from the deck 11 and is movable along a slot 65. Displacement of the locking device disengages the posts 60 and 60' and leaves the film running freely over the guide rollers 48 and 62 and 48' and 62'.

The locking device may be simplified by omitting the rollers 62 and 62' and providing fixed gripping surfaces adjacent the path of the film between the rollers 48 and 48' and the bobbins 13 and 14 respectively against which the locking device, which has complementary gripping surfaces, presses the film when allowed to come into operation by retraction of the peg 64.

Th cassette is located on the deck 11 by means of corner pieces 77 to 80 embracing angles of the edge wall 12 of the cassette.

The two magnetic heads 51 and 71 may be replaced by a single magnetic head which is mounted for movement from a position in register with one magnetic sound track of the film passing along one rectilinear path section to a position in register with the other magnetic sound track of the film passing along the other rectilinear path section.

In order to protect the picture tracks of the film from scratching and other damage the guides and driving devices may be arranged to engage only the edges of the film. This involves the use of shouldered guide rollers and a shouldered driving capstan and guides in the film gate which have a recess over the central area of the film. The necessity of having these constructional features can be avoided by using the stripes of magnetic recording material to hold the surface of the film away from the guides and driving devices. For this purpose the stripes 27 and 29 may be made thicker than is necessary for recording purposes, that is to say, about one thousandth of an inch or more in thickness, and may be duplicated on the back of the film so that both sides of the film are protected. The stripes on the back of the film are not required for recording purposes and may therefore be of inert, non-magnetic material. Additional stripes of magnetic or non-magnetic material may be applied between the central perforated strip 22 and the picture track strips 24 and 25 on both sides of the film to ensure that bowing of the film does not allow contact of the picture track surface with the guide and driving devices.

The use of the film with additional stripes as described avoids the necessity for special shaping of various elements of the cassette and the deck. In particular the driving capstan and associated pressure roller or rollers may be of simple cylindrical form and will draw the film past the magnetic head by engagement only with the stripes or ridges of magnetic recording material or inert material without any risk of contacting the film emulsion or scratching the back of the film and thus reducing the quality of the picture tracks.

The cassette shown in FIGS. 3 to 6 resembles in many respects the cassette shown in FIG. 1. It has a lower wall 110 to which are attached corner posts 111. A cover consisting of an upper wall similar to the lower wall 110 and a peripheral side wall is normally attached to the posts 111 but has been omitted from the drawings to make internal structure of the cassette clear. The casette contains two bobbins 112 and 113 to which a strip of film 114 is attached. A film gate 115 is positioned adjacent the centre of one side of the cassette. Behind the film gate 115 is an opening 116 which extends through the upper and lower walls of the cassette.

The optical system of the projector is arranged on the deck and part of it projects into the opening 116 to direct light through the film gate 115. Appropriate apertures are formed in the walls of the cassette on either side of the film gate to allow the passage of light through the film gate.

The film running between the bobbin 112 and the film gate 115 passes round one side of a sprocket 117 mounted in the cassette and is held in engagement with the sprocket 117 by rollers 118. The film running between the film gate 115 and the other bobbin 113 passes around the other side of the same sprocket 117, being held in engagement by rollers 119. By this means the film is fed towards and away from the film gate 115 at the same rate, thus maintaining the loops 120 and 121 of film necessary on either side of the film gate to allow for the intermittent movement of the film through the gate. The sprocket 117 has an internally splined hub 122 which is engaged by a driving spindle projecting through the wall 110 of the cassette. The bobbins 112 and 113 are also internally splined to engage with driving spindles projecting from the deck and through the wall 100 of the cassette.

Close to the side of the cassette away from the film gate 115 there is an opening 123 which extends through the upper and lower walls of the cassette. This opening accommodates a driven roller 124, an idler roller 125, a magnetic sound head 142 and a positioning device 143 mounted on the deck. The idler roller 125 is carried by a spindle 127 which is movable along a slot 128 in the deck towards and away from the driven roller 124. The positioning device 143 is likewise movable along a slot 144 towards and away from the head 142. It carries two forked edge guides 145 which serve to hold the film by its edges in a position such that the sound track is in register with the magnetic head 142. The film running between the bobbins 112 and 113 and the sprocket 117 passes across the opening 123 in two generally parallel straight sections 129 and 130. Of these the section 130 passes between the magnetic head 142 and the positioning device 143 and between the driven roller 124 and the idler roller 125.

In FIG. 3 the idler roller 125 and the positioning device 143 are shown in the retracted position. FIG. 4 shows these elements advanced to the operative position. The forked edge guides 145 are located on either side of the head 142 and ensure that the film passes closely over the surface of the head as it is drawn past by the rotation of the driven roller 124, against which the film is pressed by the idler roller 125. The idler roller 125 rotates freely by contact with the film. The film is slightly displaced sideways by the idler roller 125 and the positioning device 143 as they are brought to the operative position but the film is still drawn directly past the magnetic head by the driven roller.

To maintain the straightness of the sections 129 and 130 while the cassette is not in position on the deck and during its mounting and removal from the deck, guides are arranged on both sides of the opening 123. These guides comprise two parallel slots 131 and 132, along which the film passes between the sprocket 117 and the opening 123, and two corner guides arranged on the opposite side of the opening 123. The corner guide opposite the slot 131 consists of an upstanding wall 133 presenting a straight guide surface in line with the slot 131, a second upstanding wall 134 presenting a straight guide surface at right angles to the guide surface of the wall 133 and a guide roller 135 located in the corner between the walls 133 and 134. The roller 135 is so positioned that the film passing round it, when not under tension from the film transport mechanism, will lie flat against the guide surfaces of the walls 133 and 134 and will be held there by the inherent resilience of the film seeking to reduce the curvature of the film necessary for it pass round the roller. The corner guide opposite the slot 132 similarly consists of two walls 136 and 137, presenting guide surfaces at right angles, and a guide roller 138. From the walls 134 and 137 the film passes round rollers 139 and 140 respectively, to the bobbins 112 and 113.

FIG. 5 shows the details of the guides on the two sides of the opening 123. The walls 136 and 137 of the corner guide have recessed channels 146, 147 and 148, 149, respectively, over the picture area of the film so that only the edges of the film and the narrow central strip between the two picture strips of a double 8 mm. film engage the guiding surfaces. The guide roller 135 is recessed over the whole central area of the film and engages only the edges. The guide roller 138 which is similarly recessed, has been removed to enable the guiding surfaces of the walls 136 and 137 to be seen clearly in the drawing. The roller 138 is rotatably mounted on a fixed pin 150. The walls 133 and 134 are recessed in similar manner to the walls 136 and 137, respectively. The slot 132 is bounded by a fixed shaped plate 151 and a plate 152 adjustable by a screw 153 relative to a bracket 154. The slot 131 is similarly bounded by a fixed plate 155 and an adjustable plate 156.

A braking device for securing the driving sprocket 117 against rotation when the cassette is not in use is located between the slots 131 and 132. It consists of a friction block 157 which is biassed by a spring 158 into engagement with the smooth cylindrical surface of the sprocket 117 between the two rows of sprocket teeth. The block 157 is mounted for limited sliding movement by means of a bolt 159 passing through a slot 160 in the block. As shown in FIG. 6 the block 157 can be moved away from the sprocket 117 by the action of a pin 161 mounted on the projector deck on a two-armed lever 162 pivoted at 163 and coupled to the sliding block 157 at 164. FIG. 3 shows the braking device in the position which it occupies before operation of the pin 161.

While the cassette is not in use the braking device acting on the sprocket 117 restrains movement of the film engaged with the sprocket teeth. The film passes in a straight line from the sprocket through the slots 131 and 132, across the opening 123, to the corner guides and is held by the corner guides against travel in either direction. Thus the sections 129 and 130 of the film are held straight and when the cassette is correctly located on the deck, in this case with the aid of locating holes 141 which engage over studs on the deck, the section 130 comes to lie in the correct position relative to the magnetic head 142, driven roller 124 and idler roller 125. When the idler roller is now moved to press the film against the driven roller the film is drawn in substantially a straight line from the end of the slot 132, over the head 126, to the rollers 124 and 125.

Instead of, or in addition to, using the sprocket for restraining movement of the film, brake pads may be associated with the slots 131 and 132 and be controlled by a releasing device on the deck. The cassette may incorporate braking means for preventing rotation of the bobbins but since the film is held by the corner guides this is not normally necessary.

As can be clearly seen in the drawing the cassette is symmetrical about a centre line so that it may be inverted to place the straight section 129 in the position formerly occupied by the section 130. By this means two tracks arranged side by side on the film to run in opposite directions can be reproduced successively.

While the driven roller 124 and idler roller 125 have been shown as plain cylindrical rollers, they can be constructed with shoulders which provide engagement between the rollers beyond the edges of the film so that the idler roller is rotated by the driven roller.

While the description above has referred to a magnetic sound head it is clear that the cassette can also be used with projection apparatus having an optical sound head.

I claim:

1. A sound film cassette comprising an enveloping wall structure including two opposite flat walls lying generally parallel to one another, two bobbins disposed between said opposite walls with their axes of rotation perpendicular to said walls, a film gate, driving sprocket means for feeding the film towards and away from said film gate, an opening in one of said opposite walls for the entry of externally mounted sound reproduction and film drive means, guides at each side of said opening to cause the film to extend across the opening in two parallel straight sections when the cassette is not in use, and releasable means for restraining travel of the film.

2. A cassette as claimed in claim 1 including an opening in the other of said opposite walls in register with the first said opening, said cassette being symmetrical about a center line passing between the spools in a direction at right angles to the line joining the center of the spools, whereby the cassette may be inverted to play back the two tracks of a double-track film.

3. A cassette as claimed in claim 1 comprising additional guide means between the driving sprocket means and the said opening for guiding the film in a circuitous path to avoid transmission of any irregularities in the drive effected by the sprocket to the portion of the film passing said sound reproduction means.

4. A cassette as claimed in claim 3 in which said additional guide means comprise a spring-loaded arm carrying a pair of guides around which the film passes in such a way that increased tension in the film tends to move the arm against the spring bias.

5. In combination a cassette as claimed in claim 1 and a deck having mounted thereon driving members co-operating with said driving sprocket means and with at least one of said bobbins, a film traction device engageable with the film to draw it through the film gate, a light source and projection system for passing light through the film gate to project a picture track of the film, a driving capstan, a pressure roller and a magnetic head projecting into said opening adjacent the parallel straight sections, said pressure roller being movable to engage the part of said film extending along one of said sections between the pressure roller and the driving capstan and said magnetic head being disposed for co-operation with a sound track of the film which is associated with the said picture track.

6. A cassette as claimed in claim 1 wherein said releasable means comprise a locking device to prevent rotation of said driving sprocket.

7. A cassette as claimed in claim 6 in which said locking device comprises a spring-biassed brake shoe.

8. A cassette as claimed in claim 1 in which said guides comprise for each of said parallel straight sections of the film a straight slot on one side of the opening, and a corner guide on the other side of the opening presenting two straight surfaces at an angle, one of which is aligned with the slot, and a curved surface in the angle between the two straight surfaces positioned to hold the film in the angle so that it lies against the straight surfaces when not under tension, and wherein the said releasable means act on a part of the film on the side of the opening remote from the corner guide.

9. A cassette as claimed in claim 8 including a roller forming said curved surface of the corner guide.

10. A cassette as claimed in claim 8 in which the two straight surfaces of the corner guide are at an angle of 90°.

11. A cassette holding a film having two picture tracks arranged to run in opposite directions, a magnetic sound track associated with each picture track, and at least one row of traction perforations, said cassette comprising two spaced, generally parallel, walls and a peripheral wall joining said parallel walls, two bobbins having the film wound thereon, mounted between the parallel walls with their axes perpendicular to said parallel walls and disposed symmetrically with respect to a center line, a film gate straddling one end of said center line, a vision opening extending through the cassette between said parallel walls adjacent said film gate for the insertion of externally mounted parts of a projector optical system from either side of the cassette, a driving sprocket mounted on said center line, said driving sprocket having a hollow spindle, an opening in each of said parallel walls for the insertion of an externally mounted driving member into said hollow spindle, a sound opening extending through the cassette between said parallel walls, two spring-loaded guide arms located between the driving sprocket and the sound opening, a pair of guides mounted on each of said arms around which the film passes in such a way that increased tension in the film tends to move the arm against the spring bias, whereby irregularities in the drive of the film by the sprocket are smoothed out, means guiding said film from one bobbin, along a first rectilinear path section across said sound opening round one of said guide arms, past one side of said driving sprocket, through the film gate, past the other side of said driving sprocket, round the other of said guide arms, along a second rectilinear path section across said sound opening parallel to said first path section and symmetrically disposed with respect to the center line, and to the other bobbin and releasable means for restraining travel of the film, said sound opening permitting the insertion of externally mounted elements, comprising a magnetic head, a driving capstan located between said path sections, a pressure roller for co-operation with the driving capstan to engage the film along either of said path sections.

12. A sound film cassette comprising an enveloping wall structure including two opposite flat walls lying generally parallel to one another, two bobbins disposed between said opposite walls with their axes of rotation perpendicular to said walls, a film gate, driving sprocket means for feeding the film towards and away from said film gate, an opening in one of said opposite walls for the entry of a sound head and of drive rollers for drawing the film past the sound head, guides for holding the film in a straight path across the opening, and releasable means for restraining movement of the film when the cassette is not in use, wherein the guides comprise a straight slot on one side of the opening, and a corner guide on the other side of the opening presenting two straight surfaces at an angle, one of which is aligned with the slot, and a curved surface in the angle between the two straight surfaces positioned to hold the film in the angle so that it lies against the straight surfaces when not under tension, and wherein the said releasable means act on a part of the film on the side of the opening remote from the corner guide.

13. A sound film cassette comprising an enveloping wall structure including two opposite flat walls lying generally parallel to one another, two bobbins disposed between said opposite walls with their axes of rotation perpendicular to said walls, a film gate, driving sprocket means for feeding the film towards and away from said film gate, registering openings in each of said opposite walls for the entry of an externally-mounted sound head and of externally-mounted drive rollers for drawing the film past the sound head, guides for causing the film to extend in two parallel straight sections acrosss said openings, said guides comprising a pair of straight slots between said driving sprocket means and said openings and a pair of corner guides aligned with said slots on the other side of said openings, each of said corner guides comprising two straight surfaces perpendicular to each other, one of which is aligned with the corresponding slot, and a roller in the angle between the two straight surfaces positioned to hold the film in the angle so that it lies against the straight surfaces when not under tension, and a releasable locking device acting on said sprocket means to prevent rotation thereof.

14. Film projection apparatus comprising a deck and a cassette, said cassette including a film having two picture tracks arranged to run in opposite directions and a magnetic sound track associated with each picture track, two bobbins carrying the film, a film gate, driving sprocket means engaging perforations in the film to feed it towards and away from the film gate, and means guiding the film from one bobbin, along a first rectilinear path section, over a driving sprocket, through the film gate, again over a driving sprocket, along a second rectilinear path section and to the second bobbin, a light source and projection system mounted on said deck, apertures in said cassette wall structure to allow the passage of light from said light source through the film gate for the alternate projection of the picture tracks of the film, film traction means on said deck having an element for engagement with the film perforations to draw the film intermittently through the film gate, an opening in the said wall structure adjacent the film gate to permit the entry of the film engaging element of the traction device, rotary driving members on said deck positioned for co-operation with said driving sprocket and at least one of said bobbins, openings in said wall structure to permit the entry of the driving members into the cassette to engage with the driving sprocket and bobbin, releasable means in the cassette for restraining travel of the film, co-operating releasing means on the deck for freeing the film when the cassette is on the deck, a driving capstan, a pressure roller and a magnetic head on said deck, and at least one opening in said wall structure adjacent the two rectilinear path sections for the entry of said driving capstan, said pressure roller, and said magnetic head whereby the film extending along one of said path sections may be drawn past said magnetic head by said driving capstan and pressure roller.

References Cited by the Examiner

UNITED STATES PATENTS

| | | | |
|---|---|---|---|
| 1,073,411 | 9/1913 | Dressler et al. | 352—240 |
| 1,267,411 | 5/1918 | Howell | 352—239 |
| 2,322,489 | 6/1943 | Von Madaler | 352—6 |
| 2,362,019 | 11/1944 | Moore | 242—55.13 |
| 2,423,562 | 7/1947 | Lee | 242—71.2 |
| 2,434,200 | 1/1948 | Engelken | 352—8 |
| 2,624,231 | 1/1953 | Kingston | 352—83 |
| 2,625,073 | 1/1953 | Young et al. | 352—123 |
| 2,628,288 | 2/1953 | Blaney | 352—27 |
| 2,826,112 | 3/1958 | Mueller | 352—37 |

JULIA E. COINER, *Primary Examiner.*